United States Patent
Miyazaki et al.

(10) Patent No.: US 6,919,144 B2
(45) Date of Patent: Jul. 19, 2005

(54) NONAQUEOUS ELECTROLYTE SECONDARY CELL AND METHOD OF MANUFACTURING THE SAME

(75) Inventors: Shinya Miyazaki, Naruto (JP); Nobumichi Nishida, Tokushima (JP)

(73) Assignee: Sanyo Electric Co., Ltd., Moriguchi (JP)

(*) Notice: Subject to any disclaimer, the term of this patent is extended or adjusted under 35 U.S.C. 154(b) by 238 days.

(21) Appl. No.: 10/305,059

(22) Filed: Nov. 27, 2002

(65) Prior Publication Data

US 2003/0104279 A1 Jun. 5, 2003

(30) Foreign Application Priority Data

Nov. 30, 2001 (JP) ......................................... 2001-367978

(51) Int. Cl.⁷ ................................................ H01M 4/58
(52) U.S. Cl. .............................. 429/231.95; 429/231.3; 429/231.6; 429/231.5; 429/231.2; 429/221; 429/223; 429/224; 429/218.1; 429/231.1; 29/623.1
(58) Field of Search ........................... 429/231.1, 231.3, 429/231.6, 231.5, 231.2, 221, 223, 224, 218.1

(56) References Cited

U.S. PATENT DOCUMENTS

2002/0037456 A1  3/2002  Hosoya
2002/0142221 A1  10/2002  Nemoto et al.
2002/0142222 A1  10/2002  Nishida et al.

FOREIGN PATENT DOCUMENTS

| EP | 1 154 503 | 11/2001 | |
|---|---|---|---|
| JP | 10-294100 | * 11/1998 | ............ H01M/4/02 |
| JP | 2000-90933 | 3/2000 | |
| JP | 2000-195513 | 7/2000 | |
| JP | 2002-298846 | 10/2002 | |

* cited by examiner

*Primary Examiner*—Patrick Joseph Ryan
*Assistant Examiner*—Angela J. Martin
(74) *Attorney, Agent, or Firm*—Westerman, Hattori, Daniels & Adrian, LLP

(57) ABSTRACT

The present invention provides a nonaqueous electrolyte secondary cell having a positive electrode comprising mainly of a positive electrode active material, a negative electrode, and a nonaqueous electrolyte. The positive electrode active material is a lithium-containing transition metal composite oxide of a hexagonal crystal system that includes a compound represented by the general formula $LiCo_{1-x}M_xO_2$, where M is at least one species selected from the group consisting of V, Cr, Fe, Mn, Ni, Al, and Ti, and x is a decimal number in a range $0<x<1$, magnesium, and halogen. In a nonaqueous electrolyte secondary cell having such a construction, the high-temperature characteristics are improved without reducing the cell capacity.

5 Claims, 1 Drawing Sheet

NONAQUEOUS ELECTROLYTE SECONDARY CELL AND METHOD OF MANUFACTURING THE SAME

BACKGROUND OF THE INVENTION (1) Field of the Invention

The present invention relates to a nonaqueous electrolyte secondary cell having a positive electrode comprising mainly of a positive electrode active material, a negative electrode, and a nonaqueous electrolyte, and to a method of manufacturing the nonaqueous electrolyte secondary cell.

(2) Description of the Prior Art

In recent years, nonaqueous electrolyte cells have attracted attention as cells capable of providing high capacity. The nonaqueous electrolyte cell uses, as the positive electrode material, a lithium-containing composite oxide such as a lithium cobalt oxide and uses, as the negative electrode material, a lithium-aluminum alloy, a carbon material or the like capable of intercalating and deintercalating lithium ions.

However, the lithium cobalt oxide is known to have low thermal stability in a charged state. In view of this, there is a known method such as modifying the synthesis conditions (for example, by increasing the calcination temperature or by increasing the calcination time) when preparing a lithium cobalt oxide, to increase the crystallite size of the (110) plane of the lithium cobalt oxide to 900 angstroms or more. However, a cell which used a lithium cobalt oxide synthesized by such a method suffered a great deterioration, when the cell was subjected to repeated charge/discharge cycles at high temperatures or when the cell was stored in a fully charged state, exhibiting poor high-temperature characteristics.

In order to overcome such a problem, there has been suggested a method (Patent Application No. 2001-100897) in which noticing the fact that there is a correlation between pH of filtrate collected after dispersing the positive electrode active material in water and high-temperature characteristics, LiF is added when synthesizing a lithium cobalt oxide, to lower the pH of the filtrate, thereby improving the high-temperature characteristics. In this method, in dramatically improving the high-temperature characteristics, the pH of the filtrate needs to be lowered to below 9.8. The lowering of the pH of the filtrate to such levels requires adding a large amount of halogen (fluorine) such that the halogen (fluorine) content in the total amount of positive electrode active material exceeds 5 mass %, which in turn causes a reduction in the cell capacity.

SUMMARY OF THE INVENTION

In view of the foregoing and other problems in the prior art, it is an object of the present invention to provide a nonaqueous electrolyte secondary cell capable of providing improved high-temperature characteristics without reducing the cell capacity. It is another object of the present invention to provide a method of manufacturing such a cell.

These objects are accomplished in accordance with the present invention by providing a nonaqueous electrolyte secondary cell comprising: a positive electrode comprising mainly of a positive electrode active material; a negative electrode; and a nonaqueous electrolyte, wherein the positive electrode active material is a lithium-containing transition metal composite oxide of a hexagonal crystal system, the composite oxide comprising: a compound represented by a general formula $LiCo_{1-x}M_xO_2$, where M is at least one species selected from the group consisting of V, Cr, Fe, Mn, Ni, Al, and Ti, and x is a decimal number in a range $0<x<1$; magnesium; and halogen.

When the positive electrode active material contains, as is in the configuration described above, a compound represented by the foregoing general formula $LiCo_{1-x}M_xO_2$, and magnesium and halogen as additives, the pH of filtrate can be lowered with a smaller amount of additive compared with the case where the positive electrode active material contains LiF as an additive. Thus, improvement of high-temperature characteristics is ensured without reducing the cell capacity. In particular, in a lithium cobalt oxide composed of different species (V, Cr, and the like) such as a lithium-containing transition metal composite oxide of the hexagonal crystal system, represented by the general formula $LiCo_{1-x}M_xO_2$, where M is at least one species selected from the group consisting of V, Cr, Fe, Mn, Ni, Al, and Ti, and x is a decimal number in a range $0<x<1$, the pH rises easily, and thus the configuration of the present invention is advantageous.

Although exact reasons why the high-temperature characteristics can be thus improved are not clear, the following is likely to be the reasons. A cell of the present invention was repeatedly charged and discharged at high temperatures, and then was investigated. As a result of the investigation, a reduction in the amount of gas in the cell was recognized. The reduction may be due to the added halogen that is mainly present on the surface of the positive electrode active material and thus the surface of the positive electrode active material is stabilized by the halogen, reducing the amount of gas produced by dissolution of the electrolyte solution. In addition, in view of the phenomenon that addition of excess magnesium increases the lattice constant of the positive electrode active material, it is thought that the magnesium and the positive electrode active material are partly transformed into a composite on the surface of the positive electrode active material, inhibiting elution of lithium.

In the above-described nonaqueous electrolyte secondary cell, a halogen content in a total amount of the positive electrode active material may be in a range of 0.0007 to 5 mass %.

The reasons that the halogen content is thus determined are that when the halogen content is less than 0.0007 mass %, the effect of added halogen is not fully exerted, making it impossible to achieve a significant improvement in high-temperature characteristics, and on the other hand, when the halogen content exceeds 5 mass %, the halogen content is too much, reducing the cell capacity.

In the above-described nonaqueous electrolyte secondary cell, the value x for the general formula $LiCo_{1-x}M_xO_2$ may be in a range of 0.0001 to 0.005.

The reasons that the value x is thus determined are that when the value x is less than 0.0001, the effect of the added different species M is not fully exerted and thus the electrical conductivity of the positive electrode active material is not increased sufficiently, making it impossible to significantly improve the discharge characteristics, and on the other hand, when the value x exceeds 0.005, the cobalt content is relatively reduced, reducing the cell capacity.

Furthermore, in accordance with the present invention, there is provided a method of manufacturing a nonaqueous electrolyte secondary cell, comprising the step of preparing a lithium-containing transition metal composite oxide of a hexagonal crystal system containing magnesium and halogen, by mixing a lithium source, a cobalt source, a magnesium source, and a halogen source and calcining the sources.

By employing such a step, a nonaqueous electrolyte secondary cell can be prepared which provides improved high-temperature characteristics without reducing the cell capacity.

In the above-described method of manufacturing a nonaqueous electrolyte secondary cell, $MgF_2$ may be used as the magnesium source and the halogen source.

In the above-described method of manufacturing a nonaqueous electrolyte secondary cell, at least one species selected from the group consisting of Mg, MgO, $MgCl_2$, and $MgCO_3$ may be used as the magnesium source, and LiF may be used as the halogen source.

BRIEF DESCRIPTION OF THE DRAWING

For a more complete understanding of the present invention, and the advantages thereof, reference is now made to the following descriptions taken in conjunction with the accompanying drawing, in which.

DESCRIPTION OF THE PREFERRED EMBODIMENT

Figure 1:
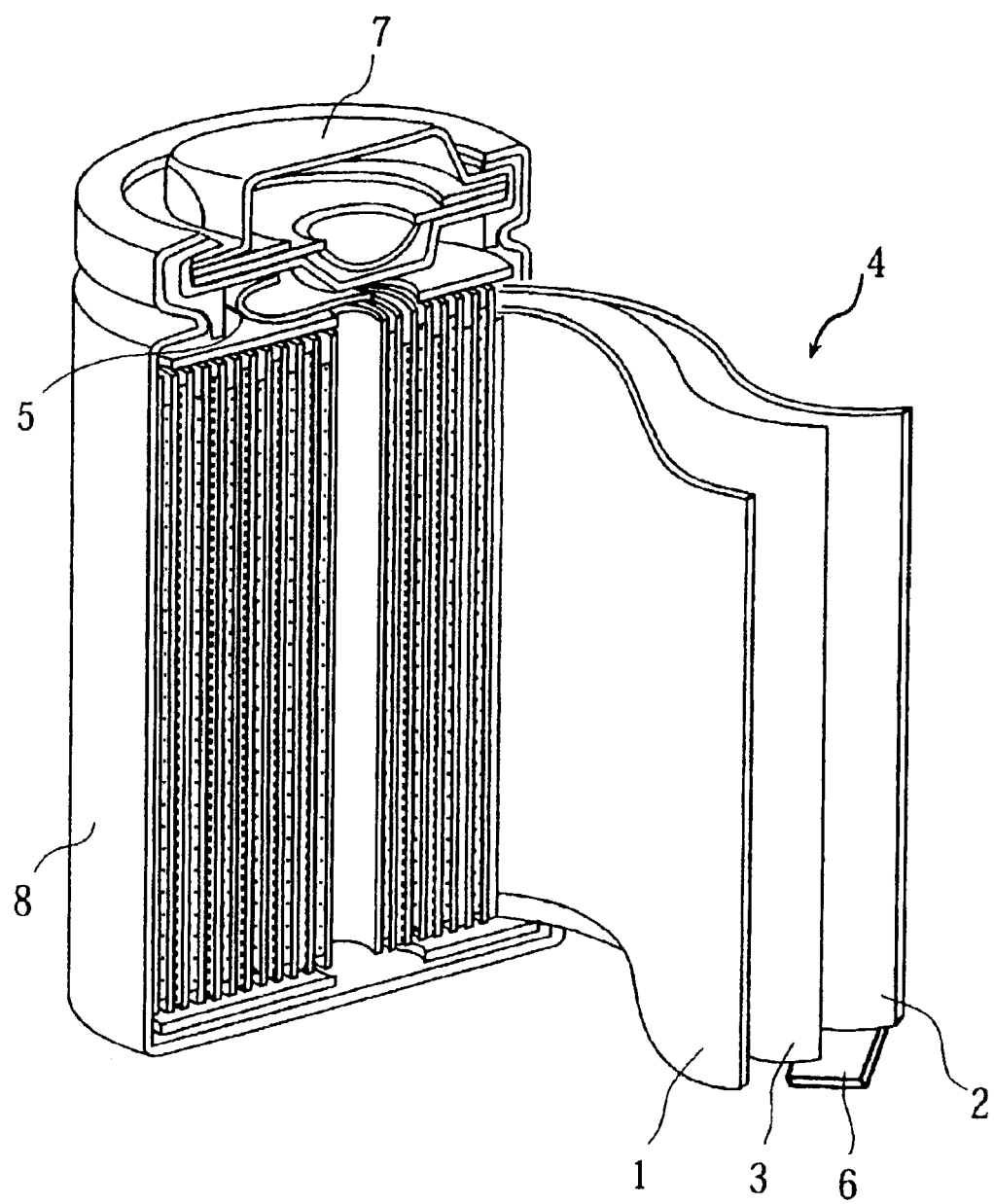
FIG. 1 is a cross-sectional view schematically showing a nonaqueous electrolyte secondary cell according to one example of the present invention.

The embodiment of the present invention is explained below.

<Preparation of the Positive Electrode>

For the starting material, lithium carbonate ($Li_2CO_3$) was used as a lithium source, and $(Cu_{0.999}V_{0.001})_3O_4$ which was a composite of tricobalt tetraoxide and vanadium (V) was used as a cobalt source. The composite of tricobalt tetraoxide and vanadium was obtained such that cobalt dissolved in an acid solution and vanadium were precipitated as a composite hydroxide and then were calcined at 300° C. Next, the lithium carbonate and the composite of tricobalt tetraoxide and vanadium were weighed out such that the molar ratio of Li to (Co+V) was 1, and there was then added $MgF_2$ such that the fluorine content in the total amount of positive electrode active material was 0.01 mass %, and then the mixture was mixed. Subsequently, the mixture was calcined in an air atmosphere to obtain a calcined product of $LiCo_{0.999}V_{0.001}O_2$ of a hexagonal crystal system containing fluorine and magnesium, and then the calcined product was ground in a mortar to an average particle size of 10 μm, thereby obtaining a positive electrode active material.

The composition of the positive electrode active material was analyzed by ICP (Inductively Coupled Plasma).

Then, 85 parts by mass of $LiC_{0.999}V_{0.001}O_2$ powder containing fluorine and magnesium, serving as the positive electrode active material, 10 parts by mass of carbon powder, serving as a conductive material, and 5 parts by mass of polyvinylidene fluoride powder, serving as a binder, were mixed. The powder mixture was then mixed with an N-methylpyrrolidone (NMP) solution, thereby preparing a slurry. The slurry was applied, by a doctor-blade method, to both surfaces of an aluminum current collector with a thickness of 20 μm, to form an active material layer. Then, the active material layer was compressed to 170 μm by using a compression roller, thereby preparing a positive electrode 1 with a short side length of 55 mm and a long side length of 500 mm.

<Preparation of the Negative Electrode>

First, 95 parts by mass of natural graphite powder and 5 parts by mass of polyvinylidene fluoride powder were mixed, and the powder mixture was mixed with an NMP solution, thereby preparing a slurry. Next, the slurry was applied, by the doctor-blade method, to both surfaces of a copper current collector with a thickness of 18 μm, to form an active material layer. Then, the active material layer was compressed to 155 μm by using a compression roller, thereby preparing a negative electrode 2 with a short side length of 57 mm and a long side length of 550 mm.

<Preparation of the Electrolyte Solution>

$LiPF_6$ was dissolved in a mixed solvent containing ethylene carbonate and diethyl carbonate in a volume ratio of 1:1, at a concentration of 1 mol/L, thereby preparing an electrolyte solution.

<Preparation of the Cell>

The positive electrode 1 and the negative electrode 2 were wound with a separator 3, which was made of a polypropylene microporous film, disposed therebetween, to prepare a spirally-wound electrode assembly 4. The electrode assembly was then enclosed in a cylindrical outer casing 8. The positive electrode 1 was connected to a positive electrode external terminal 7 via a positive electrode lead 5, and the negative electrode 2 was connected to the outer casing 8 via a negative electrode lead 6, so that chemical energy generated in the cell can be released as electrical energy outside the cell. Finally, the above-described electrolyte solution was poured into the outer casing, and then the openings of the outer casing were sealed, thereby preparing a cylindrical nonaqueous electrolyte secondary cell (height: 65 mm, diameter: 18 mm).

It is to be noted that in the preparation of the positive electrode active material, a material to be used as the magnesium source and the halogen (e.g., fluorine, chlorine, bromine, and iodine) source is not limited to $MgF_2$ used above, and it is possible to use $MgCl_2$, $MgBr_2$, and $MgI_2$. In addition, it is also possible to add the magnesium source and the halogen source individually. In such a case, examples of the magnesium source include Mg, MgO, $MgCl_2$, and $MgCO_3$. Of these magnesium sources, one species or two or more species can be used. In addition, examples of the halogen source include LiF, LiCl, LiBr, and LiI. Of these halogen sources, one species or two or more species can be used.

For the negative electrode material, in addition to the natural graphite used above, a lithium metal, a lithium alloy, a metal oxide (e.g., a tin oxide), or the like can be suitably used. Further, a solvent for the electrolyte solution is not limited to the solvent used above, and it is possible to use a solvent in which a solution with a comparatively high relative permittivity such as propylene carbonate, vinylene carbonate, and γ-butyrolactone, and a solvent with a low viscosity and low boiling point such as dimethyl carbonate, methyl ethyl carbonate, tetrahydrofuran, 1,2-dimethoxyethane, 1,3-dioxolane, 2-methoxytetrahydrofuran, and diethyl ether, are mixed at a suitable ratio. For the electrolyte for the electrolyte solution, in addition to $LiPF_6$ used above, $LiAsF_6$, $LiClO_4$, $LiBF_4$, $LiCF_3SO_3$, or the like can be used. Further, it is possible to use a polymer electrolyte, a gel electrolyte in which a polymer electrolyte is impregnated with a nonaqueous electrolyte solution, or a solid electrolyte.

EXAMPLE 1

In Example 1, a cell which was prepared in the same manner as described in the foregoing embodiment was used.

The cell thus prepared is hereinafter referred to as a cell A1 of the present invention.

EXAMPLES 2 to 7

Cells were prepared in the same manner as described in the foregoing Example 1, except that the halogen (fluorine)

content in the total amount of positive electrode active material was made to be 0.0005 mass %, 0.0007 mass %, 0.001 mass %, 1 mass %, 5 mass %, and 7 mass %, respectively.

The cells thus prepared are hereinafter referred to as cells A2 to A7 of the present invention respectively.

COMPARATIVE EXAMPLES 1 to 6

Cells were prepared in the same manner as described in the foregoing Example 1, except that as halogen LiF was used instead of $MgF_2$, and that the halogen (fluorine) content in the total amount of positive electrode active material was made to be 0.0007 mass %, 0.001 mass %, 0.01 mass %, 1 mass %, 5 mass %, and 7 mass %, respectively.

The cells thus prepared are hereinafter referred to as comparative cells X1 to X6 respectively.

EXPERIMENT

With respect to the cells A1 to A7 of the present invention and the comparative cells X1 to X6, the halogen content in the total amount of positive electrode active material, the crystallite size, the lattice constants a and c, the pH of the positive electrode active material, the average discharge voltage, the initial capacity of the cell, and the cycle capacity retention ratio at 60° C. were determined as follows. The results are shown in Table 1.

<Halogen Content>

The halogen content was analyzed by ion chromatography.

<Crystallite Size>

The crystallite size of the (110) plane of the positive electrode active material was determined by XRD (X-Ray Diffraction) measurement and using the following Sherrer's formula:

$$T = 0.9\lambda/(B \cdot \cos \theta),$$

where T is the crystallite size, λ is the wavelength of an X ray used for diffraction, B is the peak half-width, and θ is the diffraction angle.

<Lattice Constants>

The lattice constants were calculated by the least-squares method, using diffraction angles obtained by XRD (X-Ray Diffraction) measurement.

<pH of the Positive Electrode Active Material>

150 ml of ion-exchanged water was put in a 200 ml beaker, and to the ion-exchanged water there was added 2 g of a positive electrode active material. Next, a stirrer was put in the beaker and the beaker was sealed with a thin film, and thereafter, the mixture was stirred for 30 minutes. The stirred solution was absorbed and filtered through a membrane filter (which was made of PTEF (polytetrafluoroethylene) and had a pore diameter of 0.1 μm), and the filtrate was measured using a pH meter with ISFET (Ion Sensitive Field Effect Transistor) electrode.

<Initial Capacity of the Cell>

Each cell was charged at 60° C. with constant current (at a current of 1500 mA until a charge end voltage of 4.2 V was reached), and was further charged with constant voltage (at a voltage of 4.2 V until a current of 30 mA was reached), and then was discharged at a current of 1500 mA until a cell voltage of 2.75 V was reached. The cell capacity was measured on this discharge to determine the initial capacity of the cell.

<Average Discharge Voltage>

Each cell was charged and discharged under the same conditions as those for the measurement of the initial capacity of the cell. Then, the discharge curves (voltage versus discharge capacity) for the first cycle of each cell were integrated to determine the energy value at discharge, and the energy value was divided by the discharge capacity, thereby obtaining an average discharge voltage.

<Cycle Capacity Retention Ratio at 60° C.>

Each cell was charged and discharged repeatedly under the same conditions as those for the measurement of the initial capacity of the cell. Then, the discharge capacity for the first cycle of each cell (the initial capacity of the cell) and the discharge capacity for the 300th cycle of each cell were measured. The ratio of the discharge capacity for the 300th cycle to the discharge capacity for the first cycle is called the cycle capacity retention ratio at 60° C.

TABLE 1

| Cell | Composition (Molar Ratio) | Halogen | Halogen Content (Mass %) | Crystalline Size (Å) | Lattice Constant a (Å) | Lattice Constant c (Å) | pH of the Positive Electrode Active Material | Average Discharge Voltage (V) | Initial Capacity of the Cell (mAh) | Cycle Capacity Retention Ratio at 60° C. (%) |
|---|---|---|---|---|---|---|---|---|---|---|
| Cell A2 | * | $MgF_2$ | 0.0005 | 972 | 2.815 | 14.052 | 10.1 | 3.64 | 1648 | 73 |
| Cell A3 | * | $MgF_2$ | 0.0007 | 975 | 2.815 | 14.052 | 9.7 | 3.64 | 1649 | 88 |
| Cell A4 | * | $MgF_2$ | 0.001 | 971 | 2.815 | 14.052 | 9.7 | 3.66 | 1650 | 89 |
| Cell A1 | * | $MgF_2$ | 0.01 | 972 | 2.815 | 14.052 | 9.6 | 3.66 | 1650 | 89 |
| Cell A5 | * | $MgF_2$ | 1 | 969 | 2.815 | 14.052 | 9.6 | 3.65 | 1649 | 89 |
| Cell A6 | * | $MgF_2$ | 5 | 969 | 2.815 | 14.053 | 9.6 | 3.64 | 1647 | 88 |
| Cell A7 | * | $MgF_2$ | 7 | 966 | 2.816 | 14.053 | 9.6 | 3.64 | 1584 | 89 |
| Cell X1 | * | LiF | 0.0007 | 1052 | 2.815 | 14.052 | 10.3 | 3.64 | 1647 | 69 |
| Cell X2 | * | LiF | 0.001 | 1051 | 2.815 | 14.052 | 9.9 | 3.65 | 1652 | 84 |
| Cell X3 | * | LiF | 0.01 | 1048 | 2.815 | 14.052 | 9.8 | 3.66 | 1651 | 85 |
| Cell X4 | * | LiF | 1 | 1043 | 2.815 | 14.052 | 9.8 | 3.65 | 1645 | 84 |

TABLE 1-continued

| Cell | Composition (Molar Ratio) | Halogen | Halogen Content (Mass %) | Crystalline Size (Å) | Lattice Constant a (Å) | Lattice Constant c (Å) | pH of the Positive Electrode Active Material | Average Discharge Voltage (V) | Initial Capacity of the Cell (mAh) | Cycle Capacity Retention Ratio at 60° C. (%) |
|---|---|---|---|---|---|---|---|---|---|---|
| Cell X5 | * | LiF | 5 | 1040 | 2.815 | 14.052 | 9.8 | 3.63 | 1642 | 83 |
| Cell X6 | * | LiF | 7 | 1042 | 2.815 | 14.052 | 9.7 | 3.62 | 1580 | 84 |

*1(Li)/0.999(Co)/0.001(Ti)

As is clear from Table 1 above, in comparing the cells A1 and A3 to A7 of the present invention with the comparative cells X1 to X6, when the cells have the same halogen content, the average discharge voltage and the initial capacity of the cell are substantially the same between the cells. On the other hand, because the cells A1 and A3 to A7 of the present invention have lower pH values of the positive electrode active material than the comparative cells X1 to X6, higher cycle capacity retention ratios at 60° C. are recognized in the cells A1 and A3 to A7 than in the comparative cells X1 to X6. After further investigation, it was found that in the cell A3 of the present invention containing 0.0007 mass % $MgF_2$, the pH of the positive electrode active material is equal to or less than that of the comparative cells X3 to X6 containing 0.01 to 7 mass % LiF. As a result, it is recognized that the cell A3 has a higher cycle capacity retention ratio at 60° C. than the comparative cells X3 to X6.

Accordingly, it was found that it was more advantageous to add, as halogen, $MgF_2$ than to add LiF.

It is to be noted, however, that in the cell A2 of the present invention containing 0.0005 mass % halogen, the pH of the positive electrode active material is not lowered sufficiently, reducing the cycle capacity retention ratio at 60° C., whereas in the cell A7 of the present invention containing 7 mass % halogen, it is recognized that the initial capacity of the cell is reduced due to the presence of excess halogen. By contrast, such a problem does not occur in the cells A1 and A3 to A6 of the present invention containing 0.0007 to 5 mass % halogen. Thus, it was found that the halogen content is preferably in the range of 0.0007 to 5 mass %.

The cell A7 of the present invention containing 7 mass % halogen has a large lattice constant a and a large lattice constant c. In view of this, it is thought that Mg has been partly transformed into a composite on the surface of the positive electrode active material.

Furthermore, it was confirmed that all of the cells A1 to A7 of the present invention had a crystallite size of over 900 angstroms.

What is claimed is:

1. A nonaqueous electrolyte secondary cell comprising:
   a positive electrode comprising mainly of a positive electrode active material;
   a negative electrode; and
   a nonaqueous electrolyte,
   wherein the positive electrode active material is a lithium-containing transition metal composite oxide of a hexagonal crystal system, the composite oxide comprising:
   a compound represented by a general formula $LiCo_{1-x}M_xO_2$, where M is at least one species selected from the group consisting of V, Cr, Fe, Mn, Ni, Al, and Ti, and x is a decimal number in a range 0<x<1;
   magnesium; and
   halogen;
   wherein a halogen content in a total amount of the positive electrode active material is in a range of 0.0007 to 5 mass %; and
   wherein the magnesium is in an amount necessary to lower the pH of filtrate to below 9.8, the filtrate collected after dispersing the positive electrode active material in water.

2. The nonaqueous electrolyte secondary cell according to claim 1, wherein the value x for the general formula $LiCo_{1-x}M_xO_2$ is in a range of 0.0001 to 0.005.

3. A method of manufacturing a nonaqueous electrolyte secondary cell, comprising the steps of:
   preparing a lithium-containing transition metal composite oxide of a hexagonal crystal system containing magnesium and halogen, by mixing a lithium source, a cobalt source, a magnesium source, and a halogen source and calcining the sources, a halogen content in a total amount of the positive electrode active material being in range of 0.0007 to 5 mass %, the magnesium being in an amount necessary to lower the pH of filtrate to below 9.8, the filtrate collected after dispersing the positive electrode active material in water;
   preparing a positive electrode using a positive electrode active material containing the composite oxide;
   preparing an electrode assembly by arranging the positive electrode and a negative electrode with a separator disposed therebetween; and
   sealing, after enclosing the electrode assembly and a nonaqueous electrolyte solution in a cell outer casing, openings of the cell outer casing.

4. The method of manufacturing a nonaqueous electrolyte secondary cell according to claim 3, wherein $MgF_2$ is used as the magnesium source and the halogen source.

5. The method of manufacturing a nonaqueous electrolyte secondary cell according to claim 3, wherein at least one species selected from the group consisting of Mg, MgO, $MgCl_2$, and $MgCO_3$ is used as the magnesium source, and wherein LiF is used as the halogen source.

* * * * *

UNITED STATES PATENT AND TRADEMARK OFFICE
CERTIFICATE OF CORRECTION

PATENT NO. : 6,919,144 B2
DATED : July 19, 2005
INVENTOR(S) : Shinya Miyazaki et al.

It is certified that error appears in the above-identified patent and that said Letters Patent is hereby corrected as shown below:

Column 3,
Line 30, correct "$(Cu_{0.999}V_{0\ 001})_3O_4$" into -- $(Cu_{0.999}V_{0.001})_3O_4$ --.
Lines 43 and 49, correct "$LiCo_{0.999}V_{0\ 001}O_2$" into -- $LiCo_{0.999}V_{0.001}O_2$ --.

Column 5,
Line 26, correct "60 °C." into -- 60 °C --.

Column 6,
Lines 17 and 33, correct "60 °C." into -- 60 °C --.

Columns 5 and 6,
Table 1, correct "Crystalline" into -- Crystallite --; and correct "60 °C." into -- 60 °C --.

Columns 7 and 8,
Table 1, correct "Crystalline" into -- Crystallite --; and correct "60 °C." into -- 60 °C --.

Column 7,
Lines 22, 30 and 37, correct "60 °C." into -- 60°C --.

Signed and Sealed this

Twenty-seventh Day of December, 2005

JON W. DUDAS
*Director of the United States Patent and Trademark Office*